United States Patent
Kim et al.

(10) Patent No.: US 12,494,730 B2
(45) Date of Patent: Dec. 9, 2025

(54) ELECTRIC MOTOR CONTROL

(71) Applicant: GM GLOBAL TECHNOLOGY OPERATIONS LLC, Detroit, MI (US)

(72) Inventors: Junghoon Kim, Springboro, OH (US); Chandra S. Namuduri, Troy, MI (US); Yilun Luo, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 222 days.

(21) Appl. No.: 18/481,438

(22) Filed: Oct. 5, 2023

(65) Prior Publication Data

US 2025/0119086 A1    Apr. 10, 2025

(51) Int. Cl.
| | | |
|---|---|---|
| *H02P 27/08* | (2006.01) | |
| *H02K 3/28* | (2006.01) | |
| *H02P 25/18* | (2006.01) | |
| *H02P 25/22* | (2006.01) | |

(52) U.S. Cl.
CPC ............. *H02P 25/22* (2013.01); *H02K 3/28* (2013.01); *H02P 25/18* (2013.01); *H02P 2207/076* (2013.01)

(58) Field of Classification Search
CPC . H02K 3/28; H02P 25/18; H02P 25/22; H02P 27/08; H02P 2207/076
USPC .................................................... 318/400.41
See application file for complete search history.

(56) References Cited

U.S. PATENT DOCUMENTS

| | | | | |
|---|---|---|---|---|
| 2014/0265994 A1* | 9/2014 | Mao | ......................... | H02K 17/14 |
| | | | | 318/773 |
| 2017/0141633 A1* | 5/2017 | Atalla | ..................... | H02P 25/22 |
| 2020/0136454 A1* | 4/2020 | Koenig | ..................... | H02K 3/28 |
| 2020/0227989 A1* | 7/2020 | Agrawal | ................ | H02K 21/22 |
| 2021/0119564 A1* | 4/2021 | Wende | ..................... | H02P 25/22 |
| 2023/0231504 A1* | 7/2023 | Kaliyannan | ............ | H02P 27/08 |
| | | | | 318/503 |
| 2023/0327662 A1* | 10/2023 | Kikuchi | ............... | H03K 19/007 |
| | | | | 307/130 |

FOREIGN PATENT DOCUMENTS

| | | |
|---|---|---|
| DE | 102015226161 A1 | 6/2017 |
| DE | 102019128473 A1 | 4/2021 |
| DE | 112021004099 T5 | 6/2023 |
| EP | 4216417 A1 | 7/2023 |

OTHER PUBLICATIONS

German Search Report dated Jun. 20, 2024.

* cited by examiner

*Primary Examiner* — Gabriel Agared
(74) *Attorney, Agent, or Firm* — Quinn IP Law (57) ABSTRACT

A motor vehicle includes a multiphase AC electric motor having a stator wound with a first stator winding set including three phases and a second stator winding set including three phases, the three phases of the first stator winding set and the three phases of the second stator winding set wound oppositely to one another in the stator. Additionally, the motor vehicle includes a source of stored electrical energy and an inverter coupled to the source of stored electrical energy and to the electric motor to provide switched electrical energy to the first stator winding set and the second stator winding set. In addition, the motor vehicle includes a driver configured to simultaneously switch a relatively high side of the inverter to a first phase of the first stator winding set and a relatively low side of the inverter to a corresponding first phase of the second stator winding set.

20 Claims, 6 Drawing Sheets

ELECTRIC MOTOR CONTROL

INTRODUCTION

The present disclosure is in the field of electric motor control.

Electric motors may be used for many applications, including propulsion of electric vehicles. In the control of alternating current electric motors, stored electrical energy may be converted to alternating current by an inverter for the purpose of providing drive current to the motor. This conversion may advantageously be done by using switching elements in the inverter that switch very quickly, in order to reduce electrical switching losses. However, very fast switching may create a high rate of voltage change (dv/dt), which may disadvantageously create electrical noise in the form of electromagnetic interference. This large dv/dt may also induce unintended currents in the propulsion system of the electric vehicle, due to stray capacitance therein.

Therefore, a motor control system that may employ very fast switching but that mitigates issues associated with such switching may prove advantageous.

SUMMARY

A motor vehicle includes a multiphase alternating current (AC) electric motor having a stator wound with a first stator winding set including three phases and a second stator winding set including three phases, the three phases of the first stator winding set and the three phases of the second stator winding set wound oppositely to one another in the stator. Additionally, the motor vehicle includes a source of stored electrical energy and an inverter coupled to the source of stored electrical energy and to the multiphase AC electric motor to provide switched electrical energy to the first stator winding set and the second stator winding set. In addition, the motor vehicle includes a driver configured to simultaneously switch a relatively high side of the inverter to a first phase of the first stator winding set and a relatively low side of the inverter to a corresponding first phase of the second stator winding set. The first stator winding set may have a first neutral connection and the second stator winding set may have a second neutral connection, the first neutral connection and the second neutral connection being separate neutral connections. Further, the inverter may include two two-level inverters connected in parallel with one another.

In the motor vehicle, each of the phases of the first stator winding set may be wound together in common slots in the stator with a corresponding phase of the second stator winding set. Further yet, the first stator winding set and the second stator winding set may each include turns that are alternately wound in the common slots. Further, the driver may be a gate driver, and the gate driver may still further include a gate drive integrated circuit having a relatively high-voltage side and a relatively low-voltage side, the relatively high-voltage side referenced to two mutually-isolated ground references and the relatively low-voltage side referenced to a third ground reference.

The motor vehicle may additionally include a second driver configured to simultaneously switch the relatively low side of the inverter to the first phase of the first stator winding set and the relatively high side of the inverter to the corresponding first phase of the second stator winding set. A first resultant output voltage and a second resultant output voltage may be generated from the inverter, the first resultant output voltage being 180 degrees out of phase with the second resultant output voltage.

A motor control method for a multiphase AC electric motor having a stator wound with a first stator winding set including three phases and a second stator winding set including three phases, the three phases of the first stator winding set and the three phases of the second stator winding set wound oppositely to one another in the stator, includes simultaneously switching a relatively high side of the inverter to a first phase of the first stator winding set and a relatively low side of the inverter to a corresponding first phase of the second stator winding set. The inverter may include two two-level inverters connected in parallel. The first stator winding set may have a first neutral connection and the second stator winding set may have a second neutral connection, the first neutral connection and the second neutral connection being separate neutral connections. Optionally, simultaneously switching a relatively high side of the inverter to a first phase of the first stator winding set and a relatively low side of the inverter to a corresponding first phase of the second stator winding set may be performed via a gate drive integrated circuit having a relatively high-voltage side and a relatively low-voltage side, the relatively high-voltage side referenced to two mutually-isolated ground references and the relatively low-voltage side referenced to a third ground reference.

In the motor control method, each phase of the first stator winding set may be wound together in common slots in the stator with a corresponding phase of the second stator winding set. The method may additionally include simultaneously switching the relatively low side of the inverter to the first phase of the first stator winding set and a relatively high side of the inverter to the corresponding first phase of the second stator winding set. A first resultant output voltage and a second resultant output voltage may be generated from the inverter, the first resultant output voltage being 180 degrees out of phase with the second resultant output voltage.

A motor control system includes a multiphase AC electric motor having a stator wound with a first stator winding set including three phases and a second stator winding set including three phases, the three phases of the first stator winding set and the three phases of the second stator winding set wound oppositely to one another in the stator. The system further includes a source of stored electrical energy and an inverter coupled to the source of stored electrical energy and the multiphase AC electric motor to provide switched electrical energy to the first stator winding set and the second stator winding set. The system additionally includes a first driver configured to simultaneously switch a relatively high side of the inverter to a first phase of the first stator winding set and a relatively low side of the inverter to a corresponding first phase of the second stator winding set. Yet further, the system includes a second driver configured to simultaneously switch the relatively low side of the inverter to the first phase of the first stator winding set and the relatively high side of the inverter to the corresponding first phase of the second stator winding set. The first stator winding set has a first neutral connection and the second stator winding set has a second neutral connection, the first neutral connection and the second neutral connection being separate neutral connections.

In the motor control system, the inverter may include two two-level inverters connected in parallel. Further, the first driver may include a first gate driver and the second driver may include a second gate driver. The first gate driver may include a gate drive integrated circuit having a relatively high-voltage side and a relatively low-voltage side, the relatively high-voltage side referenced to two mutually-isolated ground references and the relatively low-voltage side referenced to a third ground reference.

The above summary does not represent every embodiment or every aspect of this disclosure. The above-noted features and advantages of the present disclosure, as well as other possible features and advantages, will be readily apparent from the following detailed description of the embodiments and best modes for carrying out the disclosure when taken in connection with the accompanying drawings and appended claims. Moreover, this disclosure expressly includes combinations and sub-combinations of the elements and features presented above and below.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Figure 1:
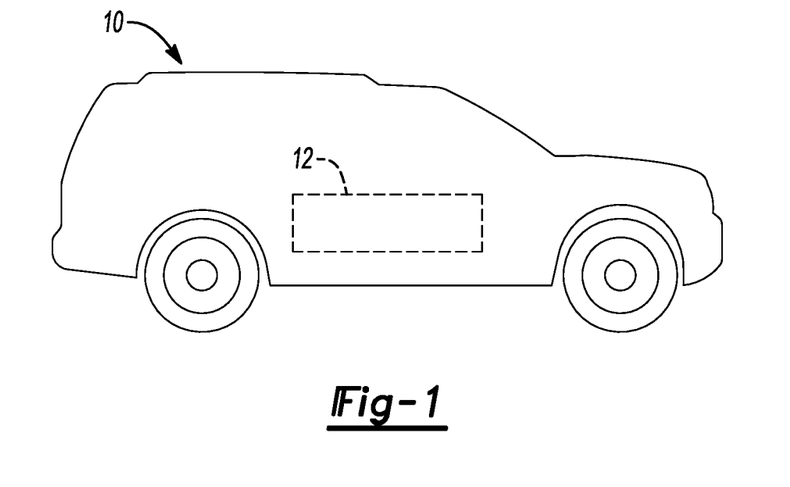
FIG. 1 shows an electric vehicle and its propulsion system.

Referring first to FIG. 1, a motor vehicle such as electric vehicle 10 is illustrated. Electric vehicle 10 may be a vehicle that uses an electric motor for at least part of the vehicle's propulsion and may be a full-electric or hybrid-electric vehicle. Further, electric vehicle 10 may be any style of vehicle, such as a car, truck, SUV, motorcycle, bicycle, all-terrain vehicle, etc. Electric vehicle 10 includes an electric propulsion system 12.

Figure 2:
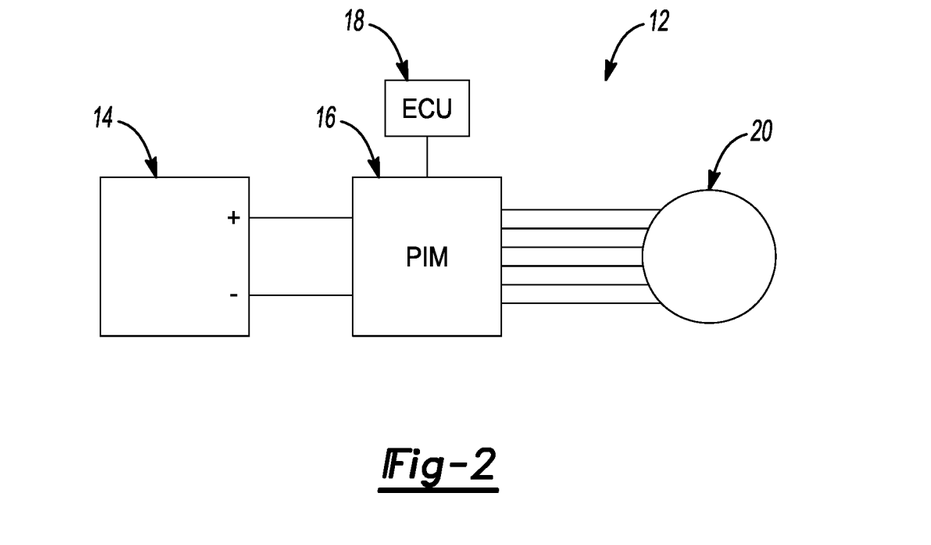
FIG. 2 is a block diagram of the propulsion system of the electric vehicle.

Referring additionally to FIG. 2, electric propulsion system 12 may include a traction battery 14, a source of stored electrical energy that may be an energy source for propulsion of electric vehicle 10. Traction battery 14 may comprise one or more batteries or battery cells. Electric propulsion system 12 may also include a power inverter module (PIM) 16, which may be a voltage inverter, an electronic control unit (ECU) 18 and an electric motor 20. Electric motor 20 may be a motor that provides tractive power for propulsion of electric vehicle 10. Electric motor 20 may be a multiphase alternating-current (AC) motor, such as a three-phase AC motor. Electric motor 20 may be, for instance, a permanent magnet motor (and, further, a permanent magnet synchronous motor) or an induction motor.

Figure 3:
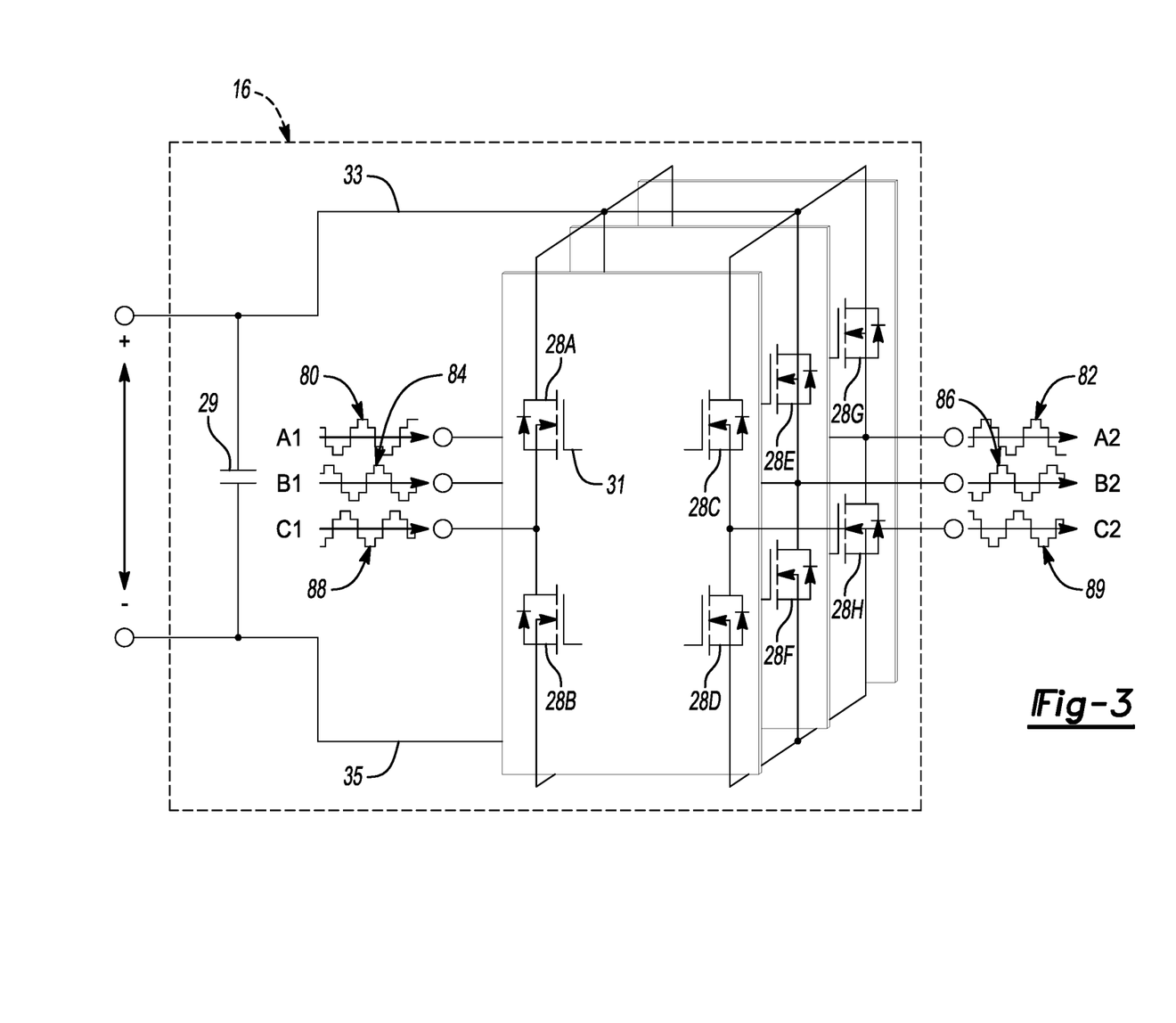
FIG. 3 is an electrical diagram of the power inverter module of FIG. 2.

Referring additionally to FIG. 3, power inverter module 16 may include twelve switching elements. The switching elements include switching element 28A, switching element 28B, switching element 28C, switching element 28D, switching element 28E, switching element 28F, switching element 28G, and switching element 28H. Additionally, four switching elements are obscured in FIG. 3 but are configured correspondingly to those which are shown. The switching elements may be of various technologies for the purpose of this disclosure, including insulated gate bipolar transistors (IGBTs) and field-effect transistors (FETs). Each switching element may have a gate for turning the switching element "ON", such as gate 31 of switching element 28A. Power inverter module 16 may also include a direct current (DC) link capacitor 29.

Power inverter module 16 may be a two-level inverter, connected across two voltage rails, positive rail 33 and negative rail 35. The voltage between positive rail 33 and negative rail 35 may be the voltage of traction battery 14. Power inverter module 16 may have six outputs, output A1, output A2, output B1, output B2, output C1, and output C2, each coupled to electric motor 20. Because power inverter module 16 may be a two-level inverter, each of output A1, output A2, output B1, output B2, output C1 and output C2 may assume one of two voltage states: the voltage of positive rail 33 and the voltage of negative rail 35.

Power inverter module 16 may be viewed as two two-level inverters (or inverter sections) connected in parallel with one another. One such inverter (or inverter section) may comprise switching element 28C, switching element 28D, switching element 28E, switching element 28F, switching element 28G and switching element 28H. The second such inverter (or inverter section) may comprise switching element 28A, switching element 28B, and the four switching elements that are obscured in the view shown in FIG. 3.

Figure 4:
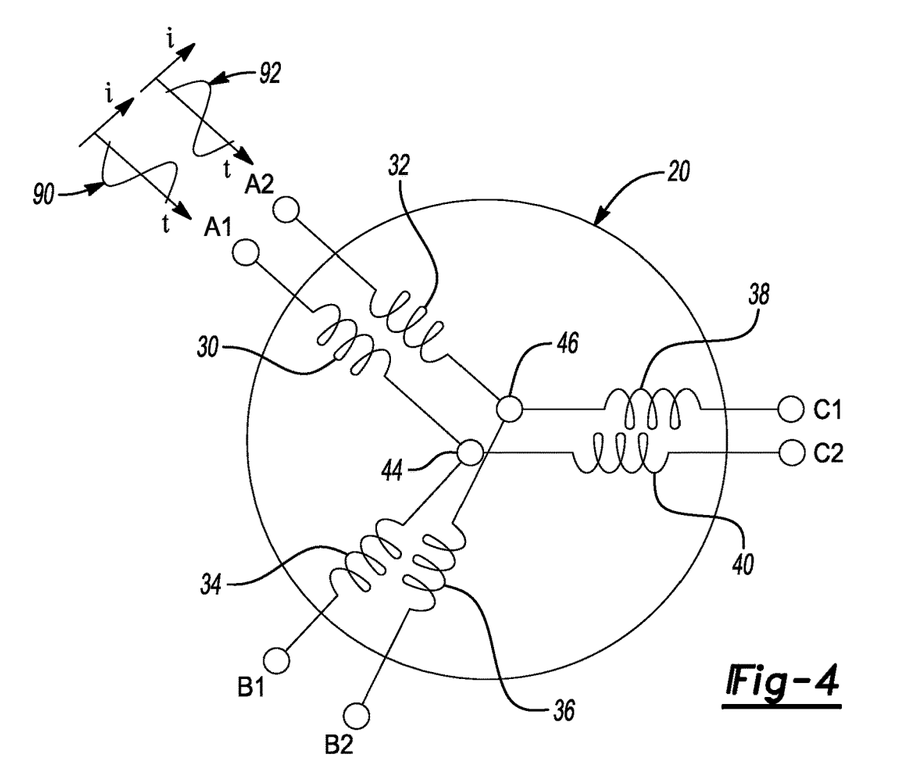
FIG. 4 illustrates the stator windings of the electric motor of FIG. 2.
Figure 5:
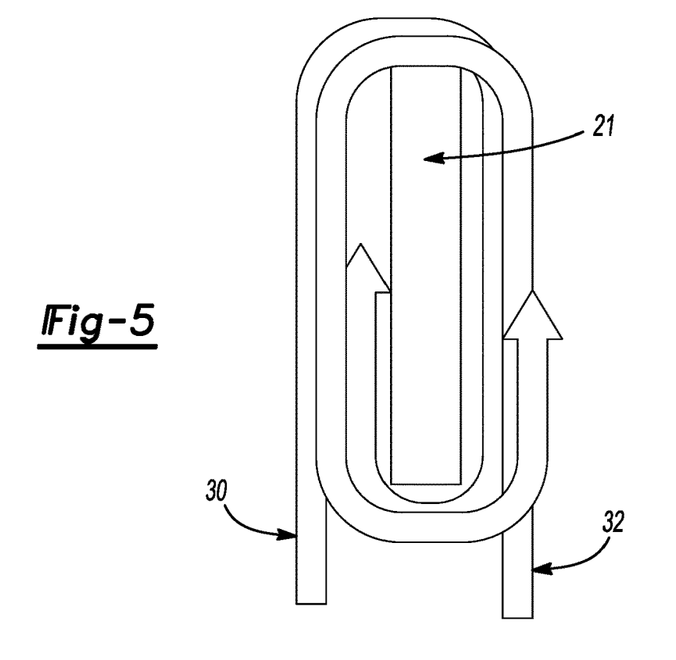
FIG. 5 shows the relative winding directions of two stator windings of one phase of the electric motor.

Referring additionally to FIG. 4, electric motor 20 may be a three-phase motor with two three-phase stator winding sets. One of the three-phase stator winding sets may comprise stator winding 30, stator winding 34, and stator winding 38; the second three-phase stator winding set may comprise stator winding 32, stator winding 36, and stator winding 40. There may further be one pair of foregoing six stator windings for each phase. Accordingly, stator winding 30 and stator winding 32 may be for one phase (called, say, Phase A of electric motor 20). Stator winding 34 and stator winding 36 may be for, say, a Phase B of electric motor 20, and stator winding 38 and stator winding 40 may be for, say, a Phase C of electric motor 20. As illustrated, stator winding 30 may be coupled to output A1 of power inverter module 16, stator winding 32 may be coupled to output A2, stator winding 34 may be coupled to output B1, stator winding 36 may be coupled to output B2, stator winding 38 may be coupled to output C1, and stator winding 40 may be coupled to output C2. Each pair of stator windings of a phase, say stator winding 30 and stator winding 32 of Phase A, may be wound in anti-parallel relative to one another, as shown in FIG. 5. As such, the two three-phase stator winding sets may be said to be wound oppositely to one another in stator 21. The two three-phase stator winding sets of electric motor 14 may each be wound in a WYE configuration and may have two neutral points, neutral point 44 and neutral point 46. Neutral point 44 and neutral point 46 may be separate neutral connections and may be electrically isolated from one another.

Electronic control unit 18 may control the switching of the switching elements of power inverter module 16 for the purpose of controlling and providing voltage to electric motor 20. Electronic control unit 18 is understood to have suitable electronic resources (microprocessor, software, memory, inputs, outputs, peripheral devices and the like) to perform the functions ascribed to electronic control unit 18 herein. Electronic control unit 18 may be a standalone controller, may be integrated with power inverter module 16, or may be integrated with other controllers in the electrical system of electric vehicle 10 that contains propulsion system 12. Electronic control unit 18 may also be networked with other controllers in the electrical system of electric vehicle 10 and share responsibility for performing the functions laid out herein. The controllers described in this disclosure may operate via "instructions", each of which may be understood to comprise one or more software operations; each instruction may further comprise or include other or additional instructions.

Recall that the pair of stator windings for each phase, for instance stator winding 30 and stator winding 32 of phase A, are wound antiparallel relative to one another, that is, in opposite sense to one another. However, with the ability of power inverter module 16 to provide outputs of opposite polarities, stator winding 30 and stator winding 32 may be energized with opposite polarities. If stator winding 30 and stator winding 32 are so energized, the magnetic fields generated by each of stator winding 30 and stator winding 32 will reinforce one another, rather than cancelling one another due to the antiparallel winding of stator winding 30 and stator winding 32. (The same is true of stator winding 34 and stator winding 36 (phase B), and stator winding 38 and stator winding 40 (phase C).) Using an inverter such as power inverter module 16 in this way allows opposite voltage polarities to be provided to the pairs of stator windings in each phase, as a method of cancelling or partially cancelling the voltage time rate of change (dv/dt) associated with switching the stator windings and reducing the electromagnetic interference (EMI) due to the switching. Wasteful and possibly motor-damaging i=Cdv/dt currents caused by stray capacitance in propulsion system 12 may also be reduced.

Figure 6:
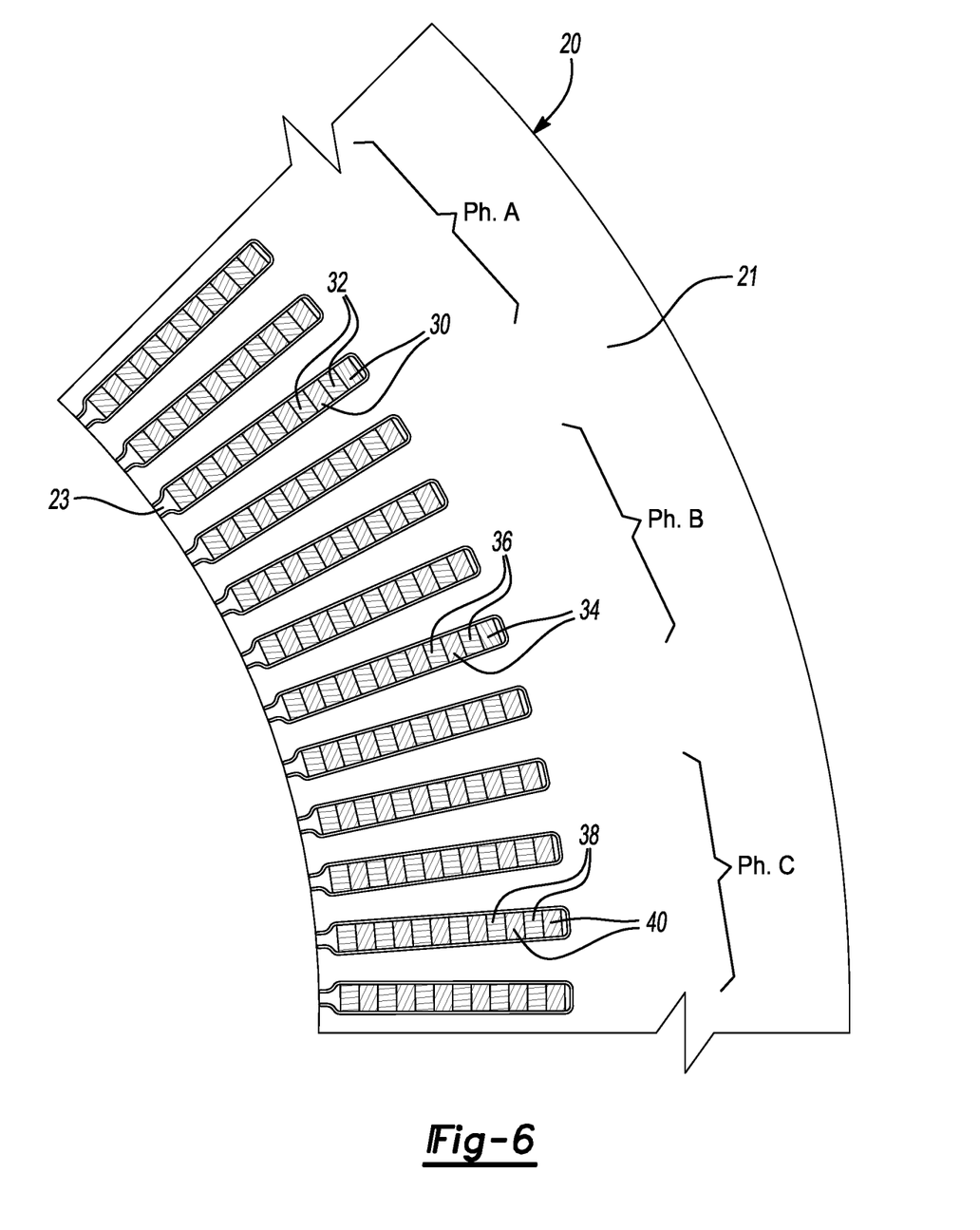
FIG. 6 illustrates the winding configurations of the stator windings of the electric motor.

The stator windings of electric motor 20 may be wound as shown in FIG. 6. Each anti-parallel stator winding, e.g., stator winding 30 and stator winding 32 of Phase A ("Ph. A," as labelled in FIG. 6), may be wound together in common (that is, the same) slots of stator 21, such as slot 23, where some windings of stator winding 30 and stator winding 32 reside. Further, the turns of each anti-parallel stator winding may be wound alternately in each slot of stator 21, such as slot 23, where some windings of stator winding 30 and stator winding 32 reside. In that way, common mode current generated in electric motor 20 may be kept to a low level if stator winding 30 and stator winding 32 are energized with voltage of opposite polarity. Further, if stator winding 30 and stator winding 32 are wound in close correspondence with one another, a current sensor for stator winding 30 may be used and the current in stator winding 32 may be inferred to be the same, even without the use of another current sensor. Stator windings 34 and 36 of Phase B ("Ph. B," as labelled in FIG. 6), as well as stator windings 38 and 40 of Phase C ("Ph. C," as labelled in FIG. 6) may be similarly wound. Winding as described may reduce electrical losses in the stator windings, due to reduction in skin effect losses. The turns of the anti-parallel-would stator windings, such as stator winding 30 and stator winding 32, may alternatively be wound beside one another in a tangential direction relative to the center of stator 21, in each slot of stator 21 where stator winding 30 and stator winding 32 reside, such as slot 23.

Figure 7:
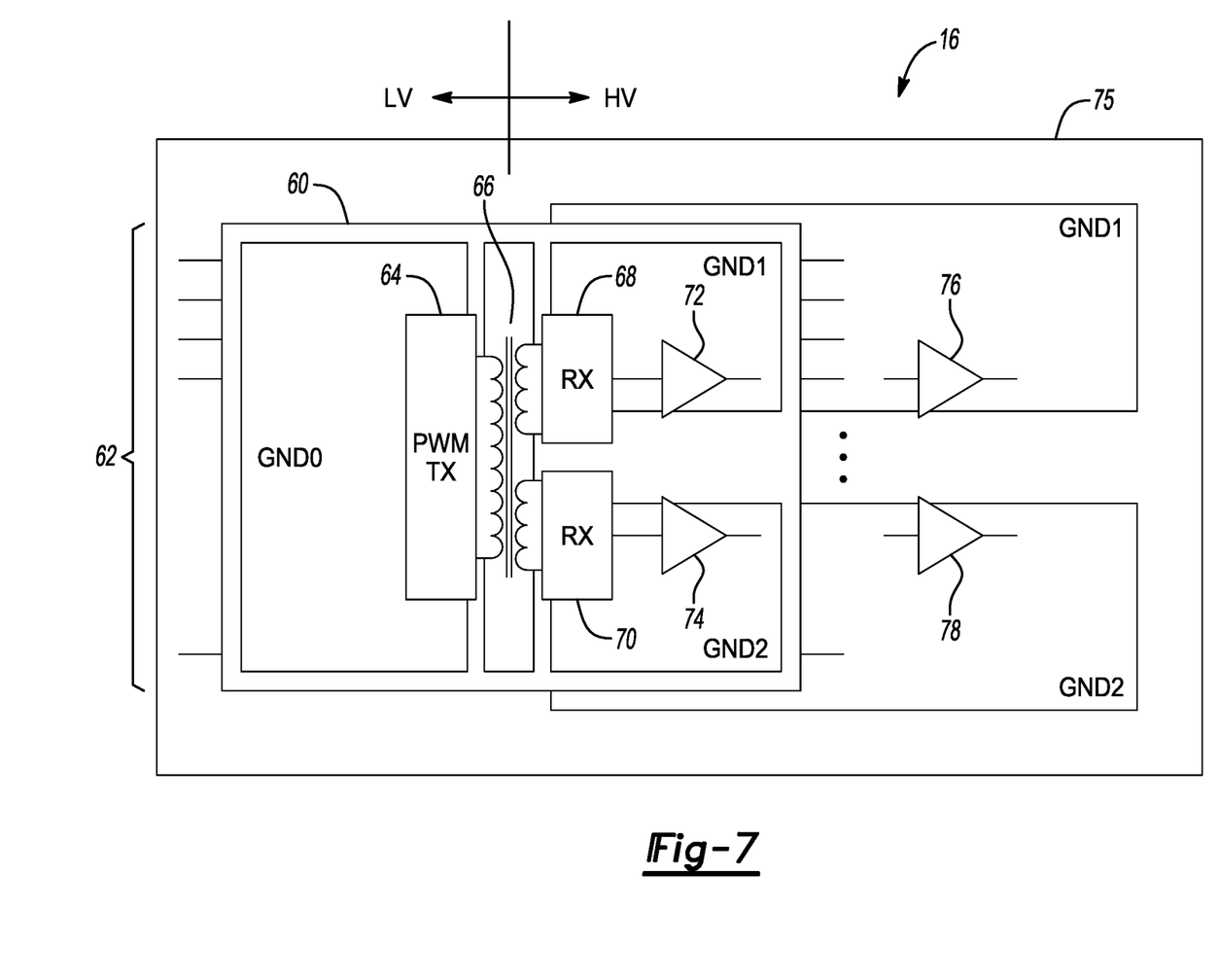
FIG. 7 illustrates the circuitry for driving the gates of the switching elements of the power inverter module of FIG. 2.

Refer additionally to FIG. 7. The voltage at which electric motor 20 operates may be relatively high, measured in tens or hundreds of volts, while the voltage at which electronic control unit 18 operates may be relatively low, such as such as digital logic voltage such as three or five volts. As such, voltage isolation may be desirable between electronic control unit 18 and power inverter module 16.

Electronic control unit 18 may perform the algorithm for the control of electric motor 20. Within electronic control unit 18, this may include a microcontroller that generates pulse-width modulated (PWM) signals for switching of the switching elements, or a dedicated PWM generator such as may be included on a gate drive integrated circuit.

The pulse-width modulated signals may be generated by a gate drive integrated circuit 60. Gate drive integrated circuit 60 may have a ground reference GND0 for the low voltage (LV) side of propulsion system 12. Gate drive integrated circuit 60 may receive signals 62 from electronic control unit 18 that reflect the desired switching signals to be provided to the gates of the switching elements of power inverter module 16. Gate drive integrated circuit 60 may have a pulse-width modulation transmitter 64 to provide PWM control signals for driving the gates of the switching elements of power inverter module 16.

In order to provide voltage isolation between the relatively low voltage (LV) and relatively high voltage (HV) portions of propulsion system 12, an isolation transformer 66 may be provided within gate drive integrated circuit 60. On the secondary side of isolation transformer 66 may be two PWM receivers, PWM receiver 68 and PWM receiver 70. Within gate drive integrated circuit 60, PWM receiver 68 may be referenced a high-voltage ground reference GND1 and PWM receiver 70 may be referenced to a second high-voltage ground reference GND2. High-voltage ground reference GND1 may be a different ground reference from high-voltage ground reference GND2. High-voltage ground reference GND1 may be isolated from high-voltage ground reference GND2.

A buffer 72 may be provided within gate drive integrated circuit 60 and referenced to ground reference GND1. A buffer 74 may be provided within gate drive integrated circuit 60 and referenced to ground reference GND2. Buffer 72 and buffer 74 may provide buffering to provide strong signals for driving the gates of the switching elements of power inverter module 16, such as gate 31. Alternatively or additionally, a buffer 76 may be provided on circuit board 75 of power inverter module 16 and referenced to ground reference GND1. Further, a buffer 78 may be provided on circuit board 75 of power inverter module 16 and referenced to ground reference GND2.

In gate drive integrated circuit 60, the driver for the gate of switching element 28A may be PWM receiver 68 and buffer 72, which are referenced to ground reference GND1.

Further, the driver for the gate of switching element 28D may be PWM receiver 70 and buffer 74, which are referenced to ground reference GND2. As such, the high-side drive for stator winding 38 and the low-side drive for stator winding 40 may switch simultaneously.

Thus, the switching of switching element 28A and switching element 28D may be synchronized (that is, simultaneous or substantially simultaneous) and in opposite polarity to one another (switching element 28A switching to positive rail 33 and switching element 28D switching to negative rail 35). This may cancel the dv/dt associated with those switching events, reducing EMI and i=Cdv/dt currents within propulsion system 12. Here, we may refer to positive rail 33 of power inverter module 16 as the "relatively high" side of power inverter module 16 and negative rail 35 of power inverter module 16 as the "relatively low" side of power inverter module 16, owing to their relative voltages.

Gate drive integrated circuit 60, including buffer 72 and buffer 74 (if those buffers are included in gate drive integrated circuit 60), and buffer 76 and buffer 78 (if provided) may be considered a driver that is operable to simultaneously provide a high side connection for stator winding 38 and a low side connection for stator winding 40. Other circuit configurations, including discrete components instead of an integrated circuit such as gate drive integrated circuit 60, may be used as drivers as well.

Likewise, then, the gates of switching element 28B and switching element 28C may be driven simultaneously from a gate drive integrated circuit with split ground references, in the same manner as just indicated. That is, the relatively-low side of power inverter module 16 may simultaneously connect to stator winding 38 while the relatively-high side of power inverter module 16 connects to stator winding 40.

The remainder of the switching elements of power inverter module 16 may additionally provide similarly simultaneous switching when controlling stator winding 30 and stator winding 32 (Phase A) as well as stator winding 34 and stator winding 36 (Phase B). That is, stator winding 30 may be simultaneously connected to the relatively high side of power inverter module 16 while stator winding 32 connects to the relatively low side of power inverter module 16; and stator winding 30 may be simultaneously connected to the relatively low side of power inverter module 16 while stator winding 32 connects to the relatively high side of power inverter module 16. And stator winding 34 may be simultaneously connected to the relatively high side of power inverter module 16 while stator winding 36 connects to the relatively low side of power inverter module 16; and stator winding 34 may be simultaneously connected to the relatively low side of power inverter module 16 while stator winding 36 connects to the relatively high side of power inverter module 16.

Splitting of the ground references (i.e., GND1 and GND2) may be advantageous because the two pair of three-phase WYE connected stator windings have separate neutral connections. Splitting the ground references in gate drive integrated circuit 60 helps facilitate the provision of reliable gate drive signals to power inverter module 16.

The net result of switching as disclosed herein may be that the voltage waveforms from each pair of outputs from each phase (output A1 and output A2 of phase A, output B1 and output B2 of Phase B, and output C1 and output C2 of Phase C) may be inverted relative to one another, that is, 180 degrees out of phase with one another or substantially 180 degrees out of phase with one another. They are shown conceptually as waveform 80 and waveform 82 (Phase A), waveform 84 and waveform 86 (Phase B), and waveform 88 and waveform 89 (Phase C) in FIG. 3. These inverted waveforms may be the result of the switching hereinabove described, where the switching signals provided to the gates of the switching elements of power inverter module 16 may be inverted relative to one another.

The corresponding current waveforms provided to electric motor 20 may include current waveform 90 to stator winding 30 and current waveform 92 to stator winding 32 (the windings of Phase A). Current waveform 90 and current waveform 92 may be 180 degrees out of phase with one another or substantially 180 degrees out of phase with one another. However, because stator winding 30 and stator winding 32 may be wound in anti-parallel, current waveform 30 and current waveform 32 will reinforce one another when creating magnetic flux for propulsion of electric motor 20. Likewise mutually-inverted current waveforms may be present in stator winding 34 and stator winding 36 (Phase B of electric motor 20) and in stator winding 38 and stator winding 40 (Phase C of electric motor 20). The inversions of the currents in each phase may result in reduced or zero common mode current in electric motor 20 and reduced or zero common mode voltage.

Figure 8:
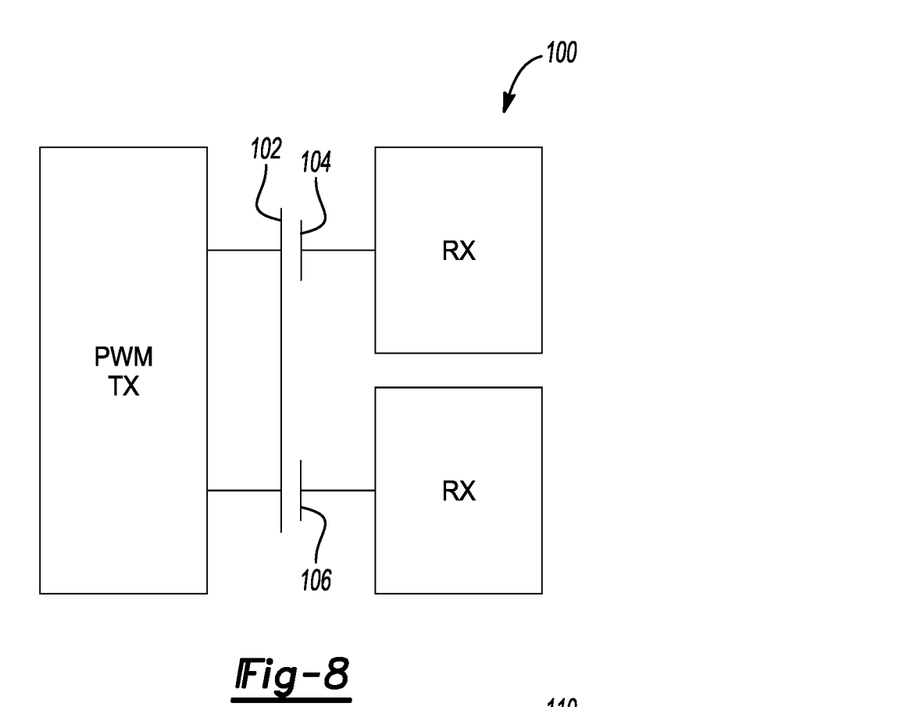
FIG. 8 illustrates alternative gate driving circuitry for driving the gates of the switching elements of the power inverter module.
Figure 9:
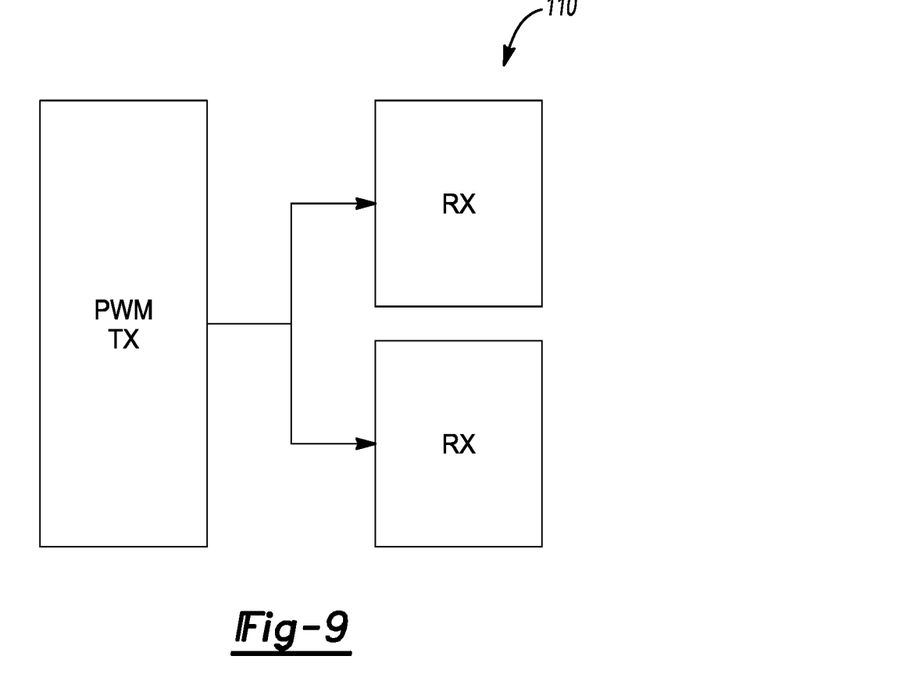
FIG. 9 illustrates second alternative gate driving circuitry for driving the gates of the switching elements of the power inverter module.

In lieu of isolation transformer 66, capacitive isolation may be employed. FIG. 8 illustrates a capacitive coupler 100 that may be used, with a PWM receiver 102 referenced to ground reference GND1 and a PWM receiver 104 referenced to ground reference GND2. Further, FIG. 9 shows that an optocoupler 110 may be used as well.

What is claimed is:

1. A motor vehicle comprising:
   a multiphase AC electric motor having a stator wound with a first stator winding set comprising three phases and a second stator winding set comprising three phases, the three phases of the first stator winding set and the three phases of the second stator winding set wound oppositely to one another in the stator;
   a source of stored electrical energy;
   an inverter coupled to the source of stored electrical energy and to the multiphase AC electric motor to provide switched electrical energy to the first stator winding set and the second stator winding set; and
   a driver configured to simultaneously switch a relatively high side of the inverter to a first phase of the first stator winding set and a relatively low side of the inverter to a corresponding first phase of the second stator winding set;
   wherein each of the phases of the first stator winding set is wound together in common slots in the stator with a corresponding phase of the second stator winding set; and
   wherein the first stator winding set and the second stator winding set each comprise turns that are alternately wound in the common slots.

2. The motor vehicle of claim 1, wherein the inverter includes at least one insulated-gate bipolar transistor.

3. The motor vehicle of claim 1, wherein the inverter includes at least one field-effect transistor.

4. The motor vehicle of claim 1, wherein the first stator winding set has a first neutral connection and the second stator winding set has a second neutral connection, the first neutral connection and the second neutral connection being separate neutral connections.

5. The motor vehicle of claim 1, wherein the inverter comprises two two-level inverters connected in parallel.

6. The motor vehicle of claim 1, wherein the driver is a gate driver.

7. The motor vehicle of claim 6, wherein the gate driver comprises a gate drive integrated circuit having a relatively high-voltage side and a relatively low-voltage side, the relatively high-voltage side referenced to two mutually-isolated ground references and the relatively low-voltage side referenced to a third ground reference.

8. The motor vehicle of claim 1, further comprising a second driver configured to simultaneously switch the relatively low side of the inverter to the first phase of the first stator winding set and the relatively high side of the inverter to the corresponding first phase of the second stator winding set.

9. The motor vehicle of claim 8, wherein a first resultant output voltage and a second resultant output voltage are generated from the inverter, the first resultant output voltage being 180 degrees out of phase with the second resultant output voltage.

10. A motor control method for a multiphase AC electric motor having a stator wound with a first stator winding set comprising three phases and a second stator winding set comprising three phases, the three phases of the first stator winding set and the three phases of the second stator winding set wound oppositely to one another in the stator, the method comprising:
simultaneously switching a relatively high side of the inverter to a first phase of the first stator winding set and a relatively low side of the inverter to a corresponding first phase of the second stator winding set;
wherein each phase of the first stator winding set is wound together in common slots in the stator with a corresponding phase of the second stator winding set; and
wherein the first stator winding set and the second stator winding set each comprise turns that are alternately wound in the common slots.

11. The motor control method of claim 10, wherein the inverter comprises two two-level inverters connected in parallel.

12. The motor control method of claim 10, wherein the first stator winding set has a first neutral connection and the second stator winding set has a second neutral connection, the first neutral connection and the second neutral connection being separate neutral connections.

13. The motor control method of claim 10, wherein simultaneously switching a relatively high side of the inverter to a first phase of the first stator winding set and a relatively low side of the inverter to a corresponding first phase of the second stator winding set is performed via a gate drive integrated circuit having a relatively high-voltage side and a relatively low-voltage side, the relatively high-voltage side referenced to two mutually-isolated ground references and the relatively low-voltage side referenced to a third ground reference.

14. The motor control method of claim 10, wherein the inverter includes at least one insulated-gate bipolar transistor.

15. The motor control method of claim 10, wherein the inverter includes at least one field-effect transistor.

16. The motor control method of claim 10, further comprising simultaneously switching the relatively low side of the inverter to the first phase of the first stator winding set and a relatively high side of the inverter to the corresponding first phase of the second stator winding set.

17. The motor control method of claim 16, wherein a first resultant output voltage and a second resultant output voltage are generated from the inverter, the first resultant output voltage being 180 degrees out of phase with the second resultant output voltage.

18. A motor control system comprising:
a multiphase AC electric motor having a stator wound with a first stator winding set comprising three phases and a second stator winding set comprising three phases, the three phases of the first stator winding set and the three phases of the second stator winding set wound oppositely to one another in the stator;
a source of stored electrical energy;
an inverter coupled to the source of stored electrical energy and the multiphase AC electric motor to provide switched electrical energy to the first stator winding set and the second stator winding set;
a first driver configured to simultaneously switch a relatively high side of the inverter to a first phase of the first stator winding set and a relatively low side of the inverter to a corresponding first phase of the second stator winding set; and
a second driver configured to simultaneously switch the relatively low side of the inverter to the first phase of the first stator winding set and the relatively high side of the inverter to the corresponding first phase of the second stator winding set; wherein
the first stator winding set has a first neutral connection and the second stator winding set has a second neutral connection, the first neutral connection and the second neutral connection being separate neutral connections;
wherein the first driver comprises a first gate driver and the second driver comprises a second gate driver; and
wherein the first gate driver comprises a gate drive integrated circuit having a relatively high-voltage side and a relatively low-voltage side, the relatively high-voltage side referenced to two mutually-isolated ground references and the relatively low-voltage side referenced to a third ground reference.

19. The motor control system of claim 18, wherein the inverter comprises two two-level inverters connected in parallel.

20. The motor control system of claim 18, wherein the inverter includes at least one insulated-gate bipolar transistor.

* * * * *